(12) United States Patent
McClintock et al.

(10) Patent No.: US 10,333,937 B2
(45) Date of Patent: *Jun. 25, 2019

(54) PRIVILEGE DISTRIBUTION THROUGH SIGNED PERMISSIONS GRANTS

(71) Applicant: Amazon Technologies, Inc., Seattle, WA (US)

(72) Inventors: Jon Arron McClintock, Seattle, WA (US); Darren Ernest Canavor, Redmond, WA (US); Daniel Wade Hitchcock, Bothell, WA (US); Jonathan Kozolchyk, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/612,067

(22) Filed: Jun. 2, 2017

(65) Prior Publication Data

US 2017/0272441 A1    Sep. 21, 2017

Related U.S. Application Data

(63) Continuation of application No. 14/207,157, filed on Mar. 12, 2014, now Pat. No. 9,674,194.

(51) Int. Cl.
*H04L 29/06* (2006.01)
*G06F 21/10* (2013.01)
(Continued)

(52) U.S. Cl.
CPC .............. *H04L 63/10* (2013.01); *G06F 21/10* (2013.01); *G06F 21/33* (2013.01); *G06F 21/34* (2013.01);
(Continued)

(58) Field of Classification Search
CPC ..... H04L 63/10; H04L 63/123; H04L 9/3263; H04L 9/3247; G06F 21/33; G06F 21/34; G06F 21/604
See application file for complete search history.

(56) References Cited

U.S. PATENT DOCUMENTS 4,868,877 A    9/1989  Fischer
2001/0039576 A1   11/2001  Kanada
(Continued)

*Primary Examiner* — Robert B Leung
(74) *Attorney, Agent, or Firm* — Davis Wright Tremaine LLP

(57) ABSTRACT

A resource owner or administrator submits a request to a permissions management service to create a permissions grant which may include a listing of actions a user may perform on a resource. Accordingly, the permissions management service may create the permissions grant and use a private cryptographic key to digitally sign the created permissions grant. The permissions management service may transmit this digitally signed permissions grant, as well as a digital certificate comprising a public cryptographic key for validating the permissions grant, to a target resource. The target resource may use the public cryptographic key to validate the digital signature of the permissions grant and determine whether a user is authorized to perform one or more actions based at least in part on a request from the user to perform these one or more actions on the resource.

20 Claims, 11 Drawing Sheets

(51) Int. Cl.
  *G06F 21/62*  (2013.01)
  *G06F 21/33*  (2013.01)
  *G06F 21/34*  (2013.01)
  *G06F 21/60*  (2013.01)
  *H04L 9/32*  (2006.01)

(52) U.S. Cl.
  CPC ........ *G06F 21/604* (2013.01); *G06F 21/6218* (2013.01); *H04L 63/102* (2013.01); *H04L 63/12* (2013.01); *H04L 63/123* (2013.01); *H04L 63/126* (2013.01); *H04L 9/3247* (2013.01)

(56) References Cited

U.S. PATENT DOCUMENTS

| | | |
|---|---|---|
| 2003/0014632 A1 | 1/2003 | Vanstone |
| 2004/0003270 A1* | 1/2004 | Bourne ................... G06F 21/10 713/193 |
| 2005/0114672 A1 | 5/2005 | Duncan et al. |
| 2007/0051808 A1 | 3/2007 | Adams et al. |
| 2007/0079381 A1 | 4/2007 | Hartung et al. |
| 2007/0219921 A1* | 9/2007 | Lee ......................... G06F 21/10 705/59 |
| 2008/0040774 A1 | 2/2008 | Wang et al. |
| 2009/0070540 A1 | 3/2009 | Dewa |
| 2009/0222903 A1 | 9/2009 | Sherkin et al. |
| 2010/0098248 A1 | 4/2010 | Anantharaman |
| 2013/0054965 A1 | 2/2013 | Catrein et al. |
| 2013/0219140 A1 | 8/2013 | Hanson et al. |
| 2014/0046906 A1 | 2/2014 | Patiejunas et al. |
| 2014/0289516 A1 | 9/2014 | Sahay |

\* cited by examiner

PRIVILEGE DISTRIBUTION THROUGH SIGNED PERMISSIONS GRANTS

CROSS REFERENCE TO RELATED APPLICATION

This application is a continuation of U.S. patent application Ser. No. 14/207,157, filed Mar. 12, 2014, now U.S. Pat. No. 9,674,194, entitled "PRIVILEGE DISTRIBUTION THROUGH SIGNED PERMISSIONS GRANTS," the disclosure of which is hereby incorporated herein in its entirety.

BACKGROUND

Resource owners and other administrators of resources often grant users access to resources to support the business needs of the resource owners, administrators and the users themselves. Accordingly, a resource owner may want to grant other users access to his/her resources in order to perform one or more actions on behalf of the resource owner while ensuring the security of his/her resources. In order to manage user privileges, a resource owner may delegate his/her authority to a number of administrators or other owners of the resource such that each of the administrators and owners may define and manage user privileges. Generally, in large-scale and other computing environments, determining who has the ability to perform a given action on a resource can present some challenges. Further, the goals of keeping privileges current can compete with other goals. A centralized system for managing privileges, for example, can have the advantage of effectively immediate updates to privileges while having the disadvantage of a potential loss of availability.

BRIEF DESCRIPTION OF THE DRAWINGS

Various embodiments in accordance with the present disclosure will be described with reference to the drawings, in which.

DETAILED DESCRIPTION

Figure 1:
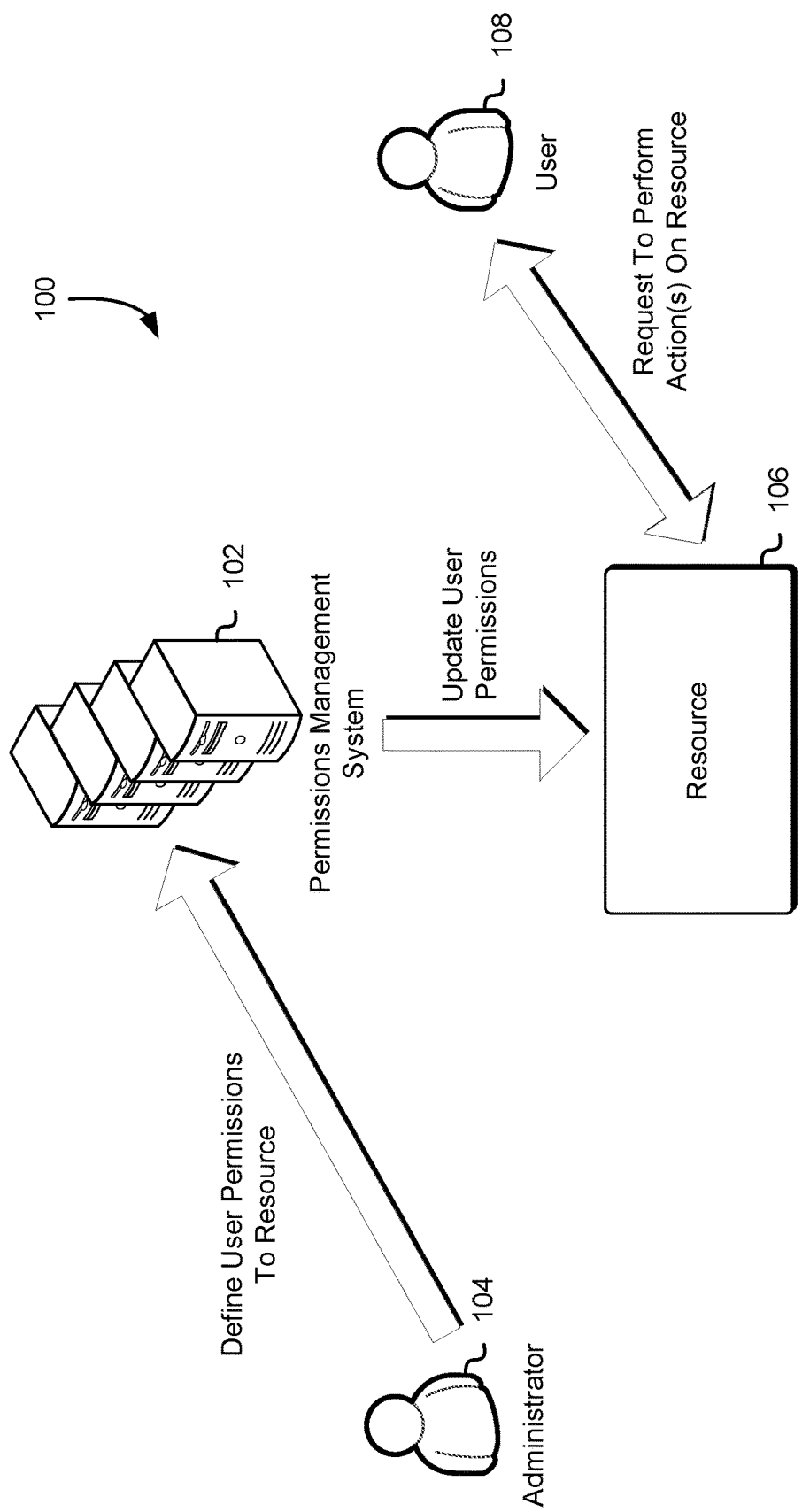
FIG. 1 shows an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to efficient privilege distribution to one or more resources through the use of digitally signed permissions grants. In an embodiment, an entity (e.g., an organization) communicates with a permissions management service, such as through an application programming interface (API) call(s) to the service, to request creation of a permissions grant, which may be used to grant a privilege to a user(s) of a resource owned by the entity (e.g., assigned to the entity by a provider of resources based on a request by the entity for allocation of a resource). The entity may be a resource owner or other administrator of a resource who is a user authorized to grant privileges for performing actions on the resource in order to support their business needs.

When a permissions grant is created using the permissions management service, the entity may use a private cryptographic key of a cryptographic key pair to digitally sign the permissions grant. In some embodiments, the digitally signed permissions grant, along with a digital certificate, are delivered to the target resource where the digital certificate is stored within a public certificate store (e.g., a data store comprising one or more physical storage devices for storage of a plurality of digital certificates) for use in validating the digital signature. When a user of the resource transmits a request to perform an action, the resource may use the digital certificate to validate the digital signature the permissions grant and determine whether the user is authorized to perform the requested action. Accordingly, if the user is authorized to perform the requested action, the resource may allow the user to perform the action. Otherwise, the resource may deny the user's request.

In an embodiment, each owner of a resource is granted a personal digital certificate, which may be stored on a hardware device, such as a smartcard. The owner of a resource may utilize his/her smartcard with a personal computing device to access a permissions management service and request creation of a new permissions grant for a particular resource. The permissions grant may be digitally signed using the owner's personal private cryptographic key. Subsequently, the owner's personal digital certificate may be distributed to the target resource by the permissions management service or some other service or component provided by the computing resource service provider. This may allow the target resource to verify a user request and the permissions grant by utilizing this personal digital certificate.

In an embodiment, once the permissions grant has been created and digitally signed by the owner of the resource, the permissions management service provides the permissions grant to a user(s) that is being granted access to utilize the resource to perform one or more actions. Accordingly, a user of the resource may present the resource with the permissions grant when he/she attempts to access the resource to perform an action(s). The resource may retrieve a digital certificate from the public certificate store to obtain a public cryptographic key of a cryptographic key pair to validate the digitally signed permissions grant obtained from the user. Subsequently, the resource may check the permissions grant and the user's requested actions to determine if the user is authorized to perform said actions.

In an embodiment, the permissions management service is configured to maintain a ledger of the permissions grants that have been issued to users and/or resources over time. For instance, an owner of a particular resource may access the permissions management service to determine what permissions have been granted for the particular resource. Accordingly, the owner of the particular resource may be able to issue a revocation request for any existing permissions grants that may be stored within the particular resource or that may be provided by a user of the particular resource. Thus, if a user of the particular resource attempts to perform a previously permissible act, the effect of the revocation may be that the particular resource may deny the request as the digitally signed permissions grant may no longer be stored within the particular resource and/or the digital certificate required to decrypt the permissions grant may no longer be stored within the public certificate store within the particular resource.

In this manner, a resource owner or other administrator of a resource may utilize permissions grants to determine a set of actions a user may perform on the resource while ensuring that the permissions grants may not be modified by any unauthorized entities. In addition, the techniques described herein facilitate additional technical advantages. For example, because, in some embodiments, a resource owner and any other administrator of a resource is required to utilize a smartcard or other hardware device to provide a personal digital certificate that is to be included with a requested permissions grant, a resource owner may be able to determine and verify which entities have defined permissible actions for other users of the resource and, if there is an aberration or other concern, immediately revoke the suspect permissions grant. This, in turn, may reduce the security risk for all users of the resource.

FIG. 1 shows an illustrative example of an environment 100 in which various embodiments may be practiced. In the environment 100, a permissions management service may provide a permissions management system 102 that enables resource owners and administrators of resources to define a level of access and the ability to perform a set of actions to users of the particular resource. For example, resource owners and administrators of resources may request creation of a permissions grant that includes a one or more actions that may be performed by one or more delegated users of the resource in order to support the business needs of the resource owners, the administrators of the resource and/or the individual users themselves. The permissions management system 102 may comprise various computing hardware resources for storing and making available these permissions grants to the various target resources and their users. Further, the permissions management system 102 may store and make available a number of digital certificates to the various target resources in order to enable these resources to decrypt a digitally signed permissions grant to determine whether the permissions grant is valid and/or authentic and, if so, obtain the set of permissible actions that may be performed by a user of the resource.

As noted above, the permissions management system 102 may be configured to enable resource owners and administrators of resources to request creation of one or more permissions grants. Accordingly, the environment 100 includes an administrator 104. The administrator 104 may be an individual or organization that may utilize the permissions management system 102 to request creation or revocation of a permissions grant for defining one or more actions that may be performed by a user on a particular resource in order to support the business needs of the individual/organization and/or the user. Each administrator 104 may utilize a permissions management service interface to create a permissions grant comprising a listing of users that may utilize a target resource owned or managed by the administrator 104 and a listing of actions that may be performed by each of these users on the target resource. Additionally, in some embodiments, the administrator 104 can utilize a smartcard or other personal hardware device that may include a private cryptographic key of a cryptographic key pair to make the newly created permissions grant cryptographically verifiable. For example, the private cryptographic key may be used to digitally sign the newly created permissions grant. Accordingly, the smartcard may also include a personal digital certificate that may comprise a public cryptographic key usable to verify the digital signature of the digitally signed permissions grant to verify the authenticity of the permissions grant. In another example, the private cryptographic key may be used to encrypt the permissions grant, such that the public cryptographic key may be used to decrypt the permissions grant and, if successful, deem the permissions grant to be verified. In yet another example, the private cryptographic key may be used to encrypt the permissions grant and, subsequently, digitally sign the encrypted permissions grant. In an embodiment, the smartcard or other personal hardware device includes the private cryptographic key usable to digitally sign the permissions grant but the resource 106 may obtain the corresponding public cryptographic key from another source. For instance, the permissions management system 102 may be configured to maintain one or more digital certificates that comprise one or more public cryptographic keys corresponding to private cryptographic keys issued to each of multiple resource owners or administrators for digitally signing permissions grant. Accordingly, when a digitally signed permissions grant is provided to a resource 106, the permissions management system 102 may further provide its digital certificate comprising the public cryptographic key to the resource 106 to enable the resource 106 to verify the digital signature. Generally, the permissions management system 102 may obtain a certificate suitable for verifying a digital signature of a permissions grant in various ways and from various sources and the content and structure of the certificates may vary in accordance with various embodiments.

While a listing of users that may be included in a permissions grant is used extensively throughout the present disclosure for the purpose of illustration, an administrator 104 may define which users may utilize a target resource, as well as the actions these users may perform on the resource, through a variety of methods. For instance, the administrator 104 may utilize the permissions management service interface to create a permissions grant comprising a listing or other explicit expression of one or more attributes which may be used to identify a set of users that may include these one or more attributes. In some embodiments, the set of users that may be authorized to perform one or more actions on a resource can change after creation of the permissions grant. For instance, if one or more attributes are specified within the permissions grant, the set of users may change as users that may include these one or more attributes join or depart from an administrator's organization. In other embodiments, the permissions grant can negatively specify an explicit or implicit listing of users (e.g., users that may not be authorized to perform one or more actions on a resource where all non-specified users would have access to the resource).

Once the permissions grant has been created, the permissions management system 102 may transmit the permissions grant to the smartcard along with one or more executable instructions that may cause the smartcard to utilize a private cryptographic key to digitally sign the permissions grant. Upon digitally signing the permissions grant, the smartcard may transmit the digitally signed permissions grant to the permissions management system 102. Subsequently, the permissions management system 102 may transmit the digitally signed permissions grant, along with the corresponding digital certificate, to the target resource 106. A resource 106 may be any securable object (e.g., a network, an application, a process, a host, a database, a data store, etc.). As will be described in greater detail below, the target resource 106 may comprise one or more data stores that may be used to persistently store the myriad permissions grants and corresponding digital certificates usable to determine what actions a user may perform on the target resource 106. For example, the target resource 106 may include a public certificate store, which may be used to persistently store the digital certificates comprising the public cryptographic keys necessary to decrypt permissions grants. Additionally, the target resource 106 may include a signed grants data store or repository which may include the digitally signed permissions grants as well as a database comprising a listing of the permissions grants stored within and the users that may be affected by these grants. In an alternative embodiment, the permissions management system 102 may provide the digitally signed permissions grant to the applicable user 108. Thus, a user 108 may provide the permissions grant to the target resource 106 when he/she accesses the target resource 106.

When a user 108 accesses the target resource 106 to submit a request to perform one or more actions on the target resource 106, the target resource 106 may determine whether a permissions grant is available that is applicable to the user 108. For instance, the user 108 may provide the digitally signed permissions grant to the target resource 106 along with the request. Alternatively, the permissions grant may be persistently stored within the signed grants data store. If the target resource 106 is able to identify an existing permissions grant applicable to the user 108, the target resource 106 may utilize the corresponding digital certificate to obtain a public cryptographic key and decrypt the permissions grant. Accordingly, the target resource 106 may be able to determine what actions the administrator 104 has permitted the user 108 to perform on the target resource 106. If the requested action is deemed to be permissible (e.g., the action is included within the permissions grant), then the target resource 106 may enable the user 108 to perform said action on the resource 106. Alternatively, if the requested action is not included within the permissions grant or if there is no permissions grant that is applicable to the user 108, the target resource 106 may deny the user 108 request to perform the one or more actions on the resource 106. While the present disclosure uses phraseology regarding resources performing various operations for the purpose of illustration, it should be noted that the scope of the present disclosure extends to embodiments where the resources cannot or do not perform such operations. For instance, in some embodiments, an additional system or component of a system that operates to control access to a resource can be configured to perform the operations discussed herein as being performed by the resource.

In an embodiment, the administrator 104 can additionally access the permissions management system 102 to request revocation of an existing permissions grant. For instance, an administrator 104 may access a ledger or other database, stored within the permissions management system 102 or another system configured to provide oversight of the communications and operations of the permissions management system 102 and a variety of resources, to determine what permissions grants are currently active within a target resource 106. The ledger may be configured such that the administrator 104 only has read access to the ledger such that the administrator 104 may not be permitted to add or remove any entries that may be included within the ledger. Accordingly, if the administrator 104 finds a permissions grant within the ledger that he/she wants to revoke, the administrator 104 may utilize a permissions management service interface to select the permissions grant and request its revocation. In response to the request, the permissions management service 102 may transmit one or more API calls to the target resource 106 that may cause the target resource 106 to remove the permissions grant and the corresponding digital certificate from the respective data stores. Thus, when a user 108 submits a request to perform one or more actions on the resource 106, the resource 106 may be unable to locate a permissions grant applicable to the user 108 and accordingly deny the request. Alternatively, if the permissions grant was provided to the user 108 rather than the resource 106, the resource 106 may still deny the request from the user 108 as the digital certificate required to decrypt the digitally signed permissions grant provided by the user 108 may no longer be available. Once the permissions grant has been revoked, the permissions management system 102 may cause the ledger to be updated to remove the revoked permissions grant or include an indication that the permissions grant has been revoked. While the present disclosure describes extensively that the permissions grant may be stored within a resource, permissions grants may be stored elsewhere so long as the permissions grants are accessible to the resources. For instance, permissions grants may be persistently stored within a data store managed by a permissions management service, which may be accessed by multiple resources.

In an embodiment, the ledger is maintained by a ledgering service which may be configured to be inaccessible by any user of the permissions management system 102. When an administrator 104 utilizes the permissions management system 102 to request creation of a new permissions grant or when the administrator 104 introduces his/her own permissions grant to the permissions management system 102, the ledgering service may record an entry for this newly introduced permissions grant within the ledger. Further, the ledgering service may use a second private cryptographic key to provide an additional digital signature to the permissions grant. Accordingly, the ledgering service may provide a second public cryptographic key corresponding to the second private cryptographic key used by the ledgering service to digitally sign the permissions grant to the target resource. Thus, the resource may be required to verify the digital signature obtained from the permissions management system 102 and the digital signature obtained from the ledgering service to utilize the permissions grant.

Figure 2:
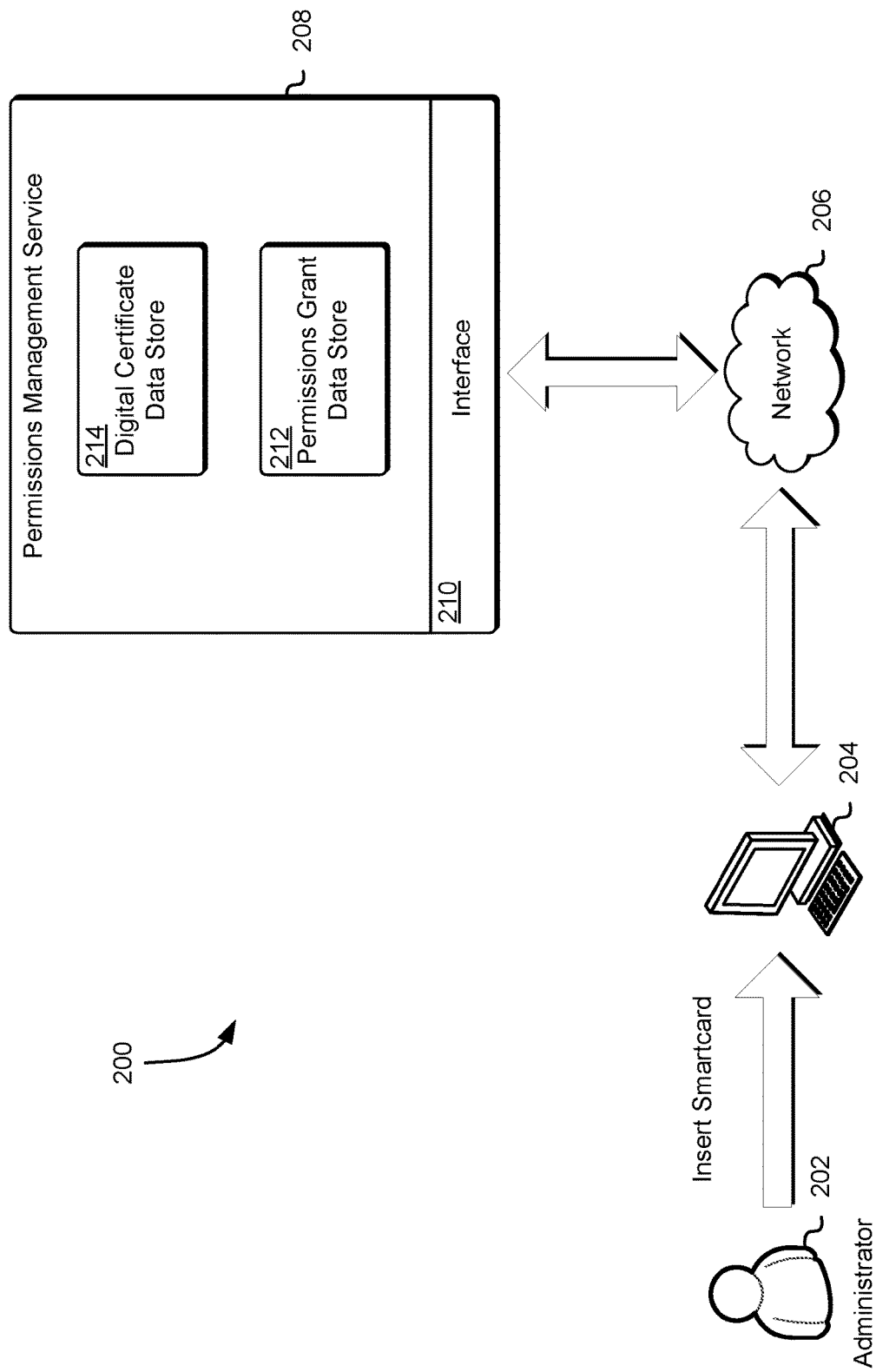
FIG. 2 shows an illustrative example of an environment in which a resource owner or administrator may create and manage one or more permissions grants in accordance with at least one embodiment.

As noted above, a resource owner or administrator may access the permissions management service to request creation or revocation of a permissions grant, which may be used to enable users of a resource to perform one or more actions on the resource. Accordingly, FIG. 2 shows an illustrative example of an environment 200 in which a resource owner or administrator 202 may create and manage one or more permissions grants in accordance with at least one embodiment. In the environment 200, an administrator 202 (e.g., a resource owner) may utilize a computer device 204 (e.g., personal computers, cell phones, handheld messaging devices, laptop computers, tablet computers, set-top boxes, personal data assistants, embedded computer systems, electronic book readers and the like) to communicate with a permissions management service 208 through one or more communications networks 206, such as the Internet. Some communications from the administrator 202, through the computer device 204, to the permissions management service 208 may cause the permissions management service 208 to operate in accordance with various techniques described herein or variations thereof.

The permissions management service 208 may be a collection of computing resources configured to enable resource owners and other administrators of resources to create and manage one or more permissions grants for defining one or more actions that a user of a resource may perform on the resource. For instance, the permissions management service 208 may include an interface 210, which may be configured to enable an administrator 202 to submit one or more requests to the permissions management service 208 to create a new permissions grant, modify an existing permissions grant, revoke an existing permissions grant and the like. Accordingly, the permissions management service 208 may include a permissions grant data store 212 which may comprise one or more physical storage devices for storage of a plurality of permissions grants. Thus, when an administrator 202 utilizes the permissions management service interface 210 to request creation of a new permissions grant, the permissions management service 208 may generate the permissions grant in response to the request and persistently store the permissions grant within the permissions grant data store 212.

In an embodiment, the permissions management service 208 further includes a digital certificate data store 214, which may comprise one or more physical storage devices for storage of a plurality of digital certificates that may be deployed along with a permissions grant to a particular resource. Each digital certificate may include a public cryptographic key which may be used, by a resource, to decrypt a digitally signed permissions grant to obtain a list of permissible actions that may be performed on the resource by a user. In an embodiment, the digital certificate data store 208 can include a single digital certificate, which may be delivered to a resource when a new permissions grant is created. For instance, the permissions management service 208 may be configured to utilize a private cryptographic key to digitally sign a newly created permissions grant. Accordingly, when this digitally signed permissions grant is delivered to the target resource, the permissions management service 208 may obtain the digital certificate from the digital certificate data store 214 and deliver the digital certificate to the target resource. This may enable the target resource to extract a public cryptographic key from the digital certificate and utilize this public cryptographic key to verify the digital signature of the digitally signed permissions grant and obtain a list of a set of actions that may be performed by a particular user on the resource.

Alternatively, the digital certificate data store 214 may be configured to store a digital certificate for each entity that may utilize the permissions management service 208 to create and manage permissions grants. For instance, in an embodiment, each administrator 202 is issued, by a service manager or other authorized entity, a personal smartcard or other hardware device configured for close-range communications with one or more computer systems of the permissions management service 208 or the computer device 204 that may include a personal digital certificate, a private cryptographic key and/or one or more set of credentials usable to access the permissions management service 208. Accordingly, the administrator 202 may be required to insert his/her smartcard into the computer device 204 in order to access the permissions management service 208. Additionally, when the administrator 202 submits a request, through the permissions management service interface 210, to create a new permissions grant, the permissions management service 208 may determine whether the administrator 202 has introduced a smartcard comprising his/her digital certificate. Upon determining that a smartcard has been introduced, the permissions management service 208 may be configured to provide, through the computer device 204, the created permissions grant to the smartcard to cause the smartcard to utilize the administrator's private cryptographic key to digitally sign the newly created permissions grant. Accordingly, the smartcard may transmit, through the computer device 204, the digitally signed permissions grant to the permissions management service 208, which may subsequently store the digitally signed permissions grant within the permissions grant data store 212. Further, the administrator's digital certificate may be stored within the digital certificate data store 214. Accordingly, the permissions management service 208 may attach the administrator's digital certificate to the digitally signed permissions grant and transmit these to the target resource.

In an alternative embodiment, the administrator 202 can personally generate a permissions grant utilizing his own computer device 204 and digitally sign the permissions grant utilizing his own smartcard, which may include the private cryptographic key used to digitally sign the permissions grant. Accordingly, the administrator 202 may provide user input to the computer device 204 to cause the computer device 204 to provide the digitally signed permissions grant and the digital certificate to the permissions management service 208 through use of the interface and request that the digitally signed permissions grant be provided to a particular resource.

Figure 3:
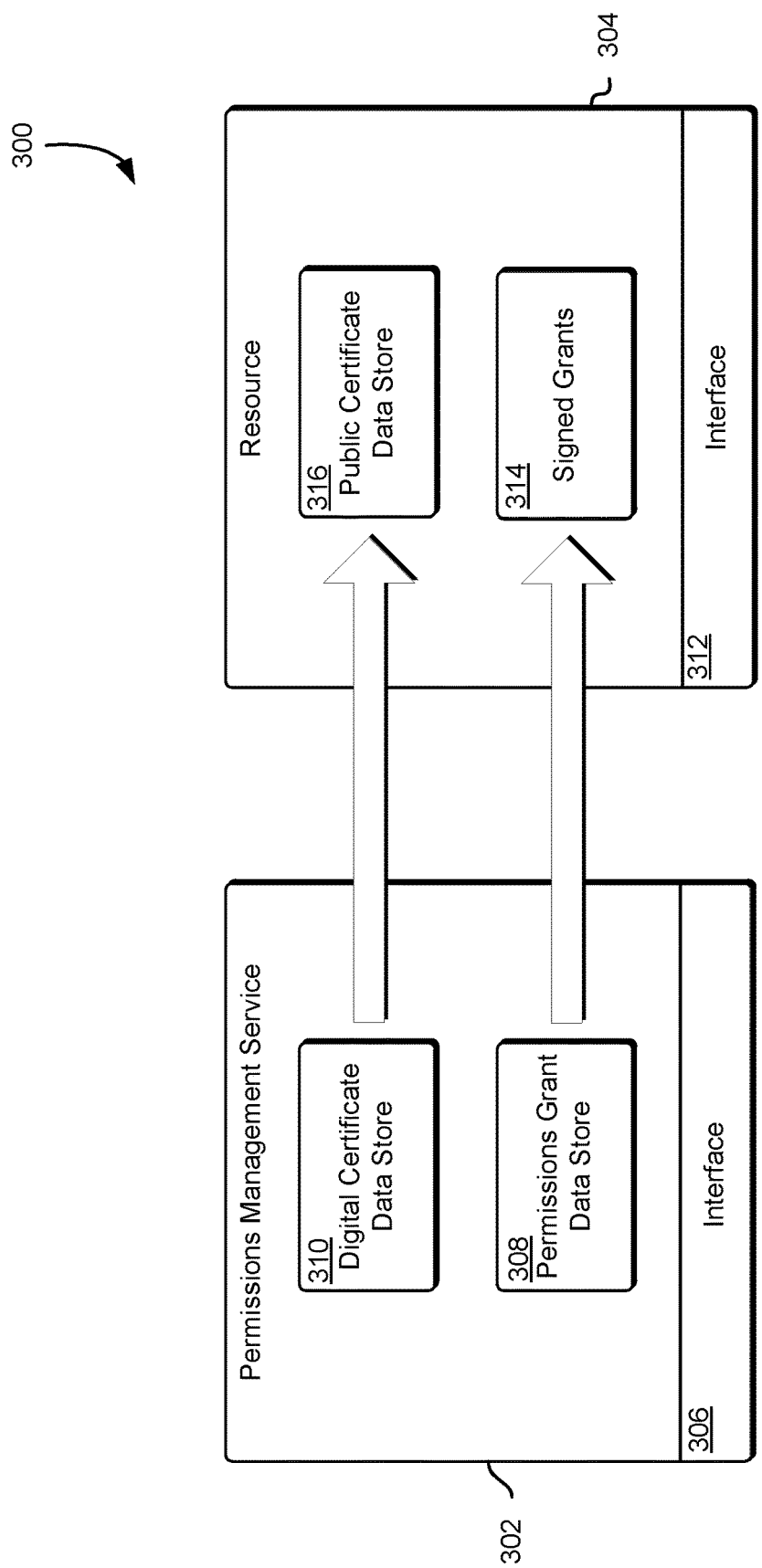
FIG. 3 shows an illustrative example of an environment in which a digitally signed permissions grant and a corresponding digital certificate may be transferred to a target resource in accordance with at least one embodiment.

As noted above, the permissions management service may be configured to transmit a digitally signed permissions grant, along with a digital certificate comprising a public cryptographic key necessary to verify the authenticity of the digitally signed permissions grant, to a resource in order to define what actions one or more users may perform on a resource. Accordingly, FIG. 3 shows an illustrative example of an environment 300 in which a digitally signed permissions grant and a corresponding digital certificate may be transferred to a target resource 304 in accordance with at least one embodiment. As noted above a resource owner or administrator of a resource may access a permissions management service 302, such as through a permissions management service interface 306, to request that a permissions grant be delivered to a resource 304 in order to enable a user of the resource 304 to perform one or more actions on the resource 304. The permissions grant may be provided by the resource owner or other administrator of a resource to the permissions management service 302 through the permissions management service interface 306. This permissions grant may then be redundantly stored within a permissions grant data store 308 within the permissions management service 302.

Each permissions grant may be digitally signed using a private cryptographic key of a cryptographic key pair. For instance, a resource owner or administrator may utilize a personal private cryptographic key to digitally sign each permissions grant created by the resource owner/administrator or by the permissions management service 302 upon his/her request. Alternatively, the permissions management service 302 may maintain a private cryptographic key which may be used to digitally sign and, in some cases, encrypt each permissions grant that is created by the permissions management service 302. Accordingly, the permissions management service 302 may redundantly store one or more digital certificates, usable to validate each permissions grant, within a digital certificate data store 310 managed by the permissions management service 302. In the embodiment wherein the permissions grant is digitally signed using a personal private cryptographic key, a resource owner or administrator that utilized his/her personal private cryptographic key to digitally sign the permissions grant may be required to additionally provide a digital certificate comprising a public cryptographic key usable to verify the authenticity of the digitally signed permissions grant. For instance, in an embodiment, a resource owner or administrator is provided with a personal smartcard or other hardware device that includes a digital certificate and, in some instances, the private cryptographic key, which the resource owner or administrator may be required to utilize when accessing the permissions management service 302 to digitally sign a newly created permissions grant. Alternatively, in the embodiment wherein the permissions grant is digitally signed using a private cryptographic key maintained by the permissions management service 302, the permissions management service 302 may also maintain its own digital certificate.

Once a permissions grant has been created, digitally signed and redundantly stored within the permissions grant data store 308, the permissions management service 302 may transmit the permissions grant to a target resource 304, where the permissions grant may be redundantly stored within a signed grants data store 314 within the resource 304. Additionally, the permissions management service 302 may be configured to transmit a corresponding digital certificate from the digital certificate data store 310 to a public certificate data store 316 within the target resource 304. The transmittal of the permissions grant and the corresponding digital certificate to the target resource 304 may be performed after a period of time or in response to a triggering event. For example, the permissions management service 302 may be configured to push digitally signed permissions grants and their corresponding digital certificates to the target resource created within the past six hours. Alternatively, the permissions management service 302 may be configured to distribute the digitally signed permissions grants and corresponding digital certificates to the target resource 304 after a certain number of permissions grants have been created and/or modified.

As will be described in greater detail below, the target resource 304 may include an interface 312, which a user may utilize to access the target resource 304 and submit a request to perform one or more actions. Based at least in part on the user request, the target resource 304 may access a database comprising a listing of signed permissions grants stored within the signed grants data store 314 and a listing of corresponding users that have been granted one or more privileges through each of the signed permissions grants. Accordingly, the target resource 304 may be able to determine if the signed grants data store 314 includes a digitally signed permissions grant that further includes a set of actions that may be performed by the user. If the signed grants data store 314 does include a digitally signed permissions grant applicable to the user, the target resource 304 may obtain a corresponding digital certificate from the public certificate data store 316 to verify the authenticity of the digitally signed permissions grant to determine whether the user is authorized to perform the requested actions. If the user is authorized to perform the requested actions, the resource 304 may enable the user to perform these requested actions. Otherwise, the resource 304 may deny the user's request.

Figure 4:
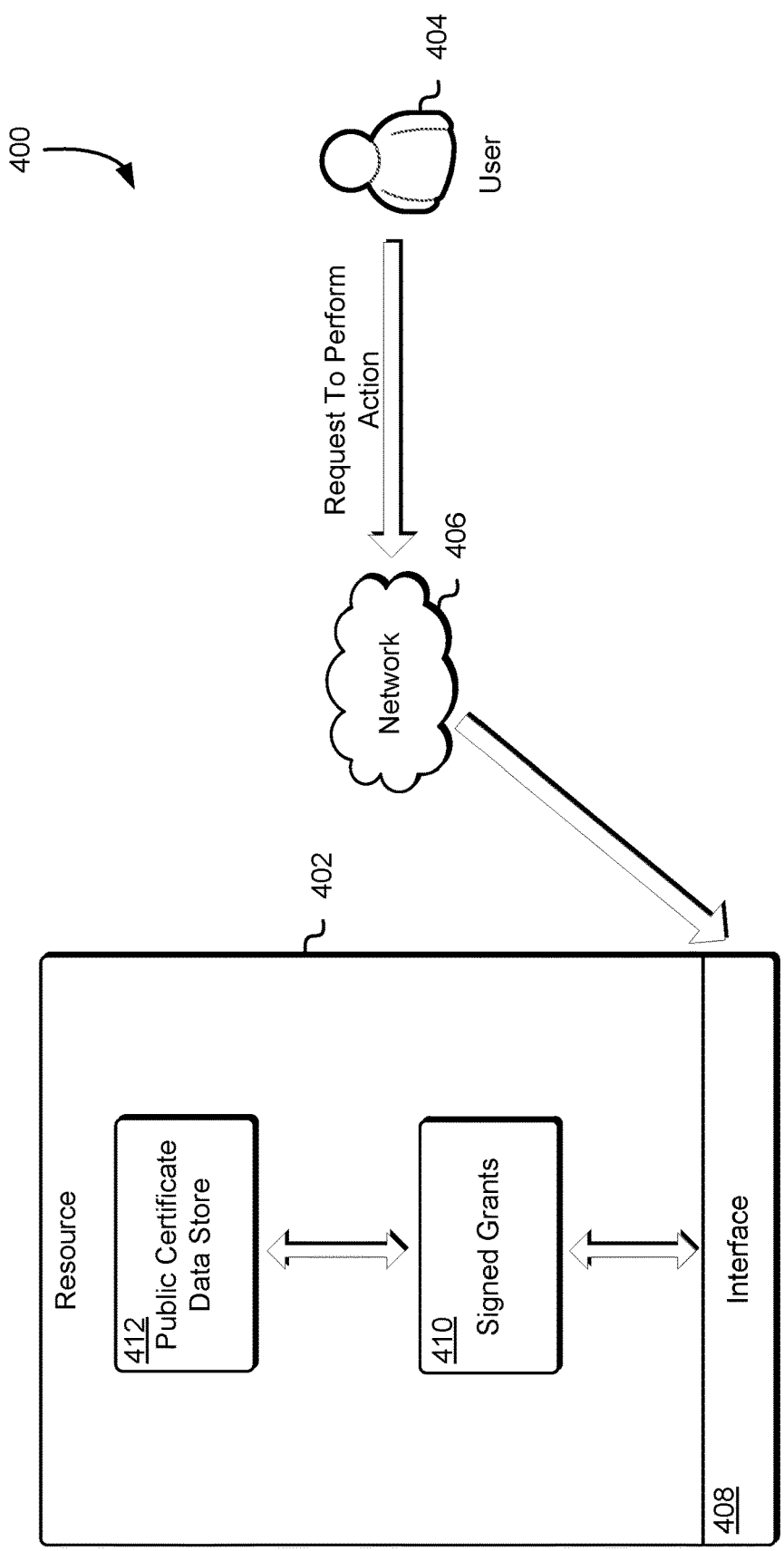
FIG. 4 shows an illustrative example of an environment in which a target resource may determine whether to process a user request to perform one or more actions utilizing the resource in accordance with at least one embodiment.

As noted above, a resource may be configured to determine whether a user may perform one or more actions on the resource in response to a request from the user to perform said actions. Accordingly, FIG. 4 shows an illustrative example of an environment 400 in which a target resource 402 may determine whether to process a user request to perform one or more actions utilizing the resource 402 in accordance with at least one embodiment. In the environment 400, a user 404 may communicate with a resource 402 through one or more communications networks 406, such as the Internet. The target resource 402 may include an interface 408, which a user 404 may utilize to submit one or more requests to perform one or more actions on the resource 402. For instance, the user 404 may utilize the interface 408 to submit a request to utilize a set of applications within the resource 402 to support the user's business needs.

Once a user 404 utilizes the interface 408 to submit a request to perform one or more actions on the resource 402, the resource 402 may access a database comprising a listing of signed permissions grants stored within a signed grants data store 410 managed by the resource 402 and a listing of corresponding users that have been granted one or more privileges through each of the signed permissions grants to determine whether the user 404 is authorized to perform the actions included within the request. As noted above, each permissions grant within the signed grants data store 410 may be provided by a permissions management service, which may enable resource owners and administrators to define permissions grants for a plurality of users of their resources. Each permissions grant may be digitally signed by a resource owner/administrator or the aforementioned permissions management service by using a private cryptographic key of a cryptographic key pair. For instance, as described in greater detail above, a resource owner or administrator may utilize a smartcard or other hardware device including a personal private cryptographic key to digitally sign any permissions grants created by the resource owner/administrator or on behalf of the resource owner or administrator by the permissions management service in response to a request. Alternatively, the permissions management service may utilize its own private cryptographic key to digitally sign each permissions grant created on behalf of a resource owner or administrator. Accordingly, each permissions grant stored within the signed grants data store 410 may be digitally signed and, in some cases, encrypted to prevent users of the resource 402 from tampering these permissions grants.

If the signed grants data store 410 includes a digitally signed permissions grant that includes a listing of one or more permissible actions that may be performed by the user 404, the resource 402 may access a public certificate data store 412 to obtain a corresponding digital certificate to verify the authenticity of the permissions grant. As noted above, each digital certificate may include a public cryptographic key of a cryptographic key pair which may be used to verify the digital signature of the permissions grant. Accordingly, the resource 402 may utilize the digital certificate from the public certificate data store 412 to verify the digital signature of the permissions grant obtained from the signed grants data store 410 and obtain the listing of permissible user actions. If the one or more actions included within the request submitted by the user 404 are not included within the listing obtained from the digitally signed permissions grant or there is no permissions grant associated with the user 404, the request from the user 404 may be denied. However, if the one or more actions are included within the listing, the resource 402 may enable the user 404 to perform these actions on the resource 402.

Figure 5:
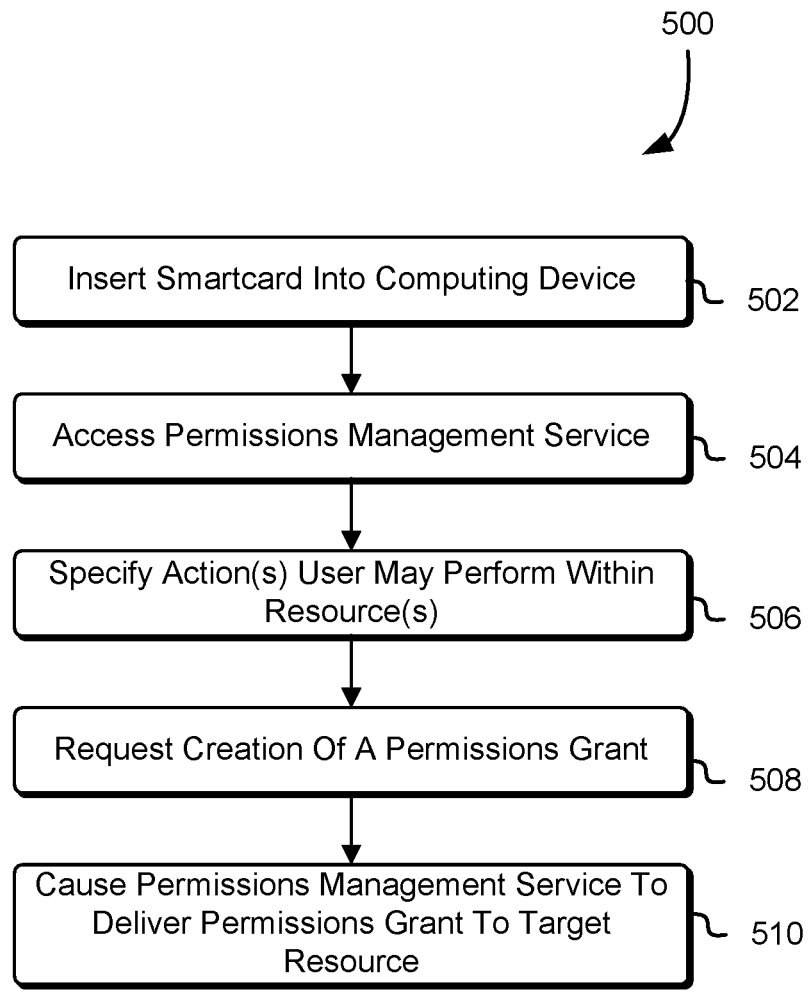
FIG. 5 shows an illustrative example of a process for interacting with a permissions management service to request creation of a permissions grant in accordance with at least one embodiment.

As noted above, a resource owner or administrator may access a permissions management service to request creation of a permission grant, which may include a list of actions that may be performed on a resource by one or more users of the resource. Accordingly, FIG. 5 shows an illustrative example of a process 500 for interacting with a permissions management service to request creation of a permissions grant in accordance with at least one embodiment. The process 500 may be performed by a resource owner and/or an administrator granted permission to manage a resource on behalf of the resource owner. Each resource owner and administrator may be provided, by a service manager or other authorized entity, a smartcard or other hardware device that may include a personal private cryptographic key and a digital certificate. The personal private cryptographic key may be used to digitally sign each permissions grant created by the resource owner/administrator or the permissions management service on behalf of the resource owner/administrator. Further, the digital certificate may include a public cryptographic key which may be used to verify the digital signature attached to the permissions grant. In some embodiments, the public cryptographic key can be used to decrypt a permissions grant encrypted using the private cryptographic key. Thus, each resource owner and administrator may be required to insert 502 a smartcard into a computing device that is to be used to communicate with the permissions management service to generate the permissions grants.

Once the resource owner or administrator has inserted his/her smartcard into the computing device, the resource owner or administrator may utilize the computing device to access 504 the permissions management service. As noted above, the resource owner or administrator may utilize the computing device to communicate with the permissions management service through one or more communications networks, such as the Internet. The permissions management service may include an interface, which may enable the resource owner or administrator to interact with the permissions management service to create and/or manage one or more permissions grants.

As noted above, each permissions grant may include a listing of users authorized to perform one or more actions on a target resource. Additionally, the permissions grant may further include a listing of actions that each user included in the listing of users may perform on the target resource. Thus, if the listing of users does not include an identifier for a particular user, the particular user may not be authorized to perform any actions on the target resource. Further, if a user attempts to perform an action on a resource that is not listed within the permissions grant, the resource may deny the user the ability to perform the action. Thus, the resource owner or administrator may be required to specify 506 one or more actions a user of the resource may perform within one or more resources. For instance, the resource owner or administrator may utilize an interface provided by the permissions management service to define a list of users and a list of associated actions each of these users may perform on a particular resource. Additionally, the resource owner or administrator may define additional parameters for this permissions grant. For instance, the resource owner or administrator may define an expiration date for the permissions grant such that after the expiration date, the permissions grant may be revoked and removed from both the permissions management service and the target resource. In an alternative embodiment, the resource owner or administrator can receive a list of users and a list of associated actions each of these users may perform on a particular resource from another entity, such as another resource owner. In another alternative embodiment, the resource owner or administrator can remotely define the list of users and list of associated actions and introduce these lists to the permissions management service when submitting the request to create a permissions grant.

Once the resource owner or administrator has determined what actions each user of a resource may perform within one or more resources, the resource owner or administrator may request 508 creation of a permissions grant. This request may be submitted to the permissions management service through the interface described above. In addition to the request, the resource owner or administrator may provide the permissions management service with his/her personal digital certificate, which may be used to verify a digital signature, attached to the permissions grant, created by the smartcard or other hardware device issued to the resource owner or administrator. As noted above, the permissions management service may transmit a newly created permissions grant to the resource owner's smartcard in order to cause the smartcard to digitally sign the permissions grant by using a private cryptographic key. Subsequently, the smartcard may transmit the digitally signed permissions grant to the permissions management service. By providing the personal digitally signed permissions grant to the permissions management service, the resource owner or administrator may cause 510 the permissions management service to deliver the digitally signed permissions grant, as well as the corresponding digital signature, to the target resource. The permissions management service may redundantly store the digitally signed permissions grant within a permissions grant data store and the corresponding digital certificate within a digital certificate data store until such time that the permissions grant and the corresponding digital certificate may be transmitted to the resource.

It should be noted that the process 500 may be performed in a different order and/or may include additional or fewer steps. For instance, instead of submitting a request to the permissions management service to create a permissions grant, the resource owner or administrator may instead create his or her own permissions grant. For example, the permissions management service may be configured to accept permissions grants created by resource owners or administrators if they are created using a particular format or programming language. Subsequently, the resource owner or administrator may utilize his/her private cryptographic key to personally digitally sign the newly created permissions grant. Accordingly, when the resource owner or administrator accesses the permissions management service, he or she may upload the digitally signed permissions grant, as well as the corresponding digital certificate, to the permissions management service.

Figure 6:
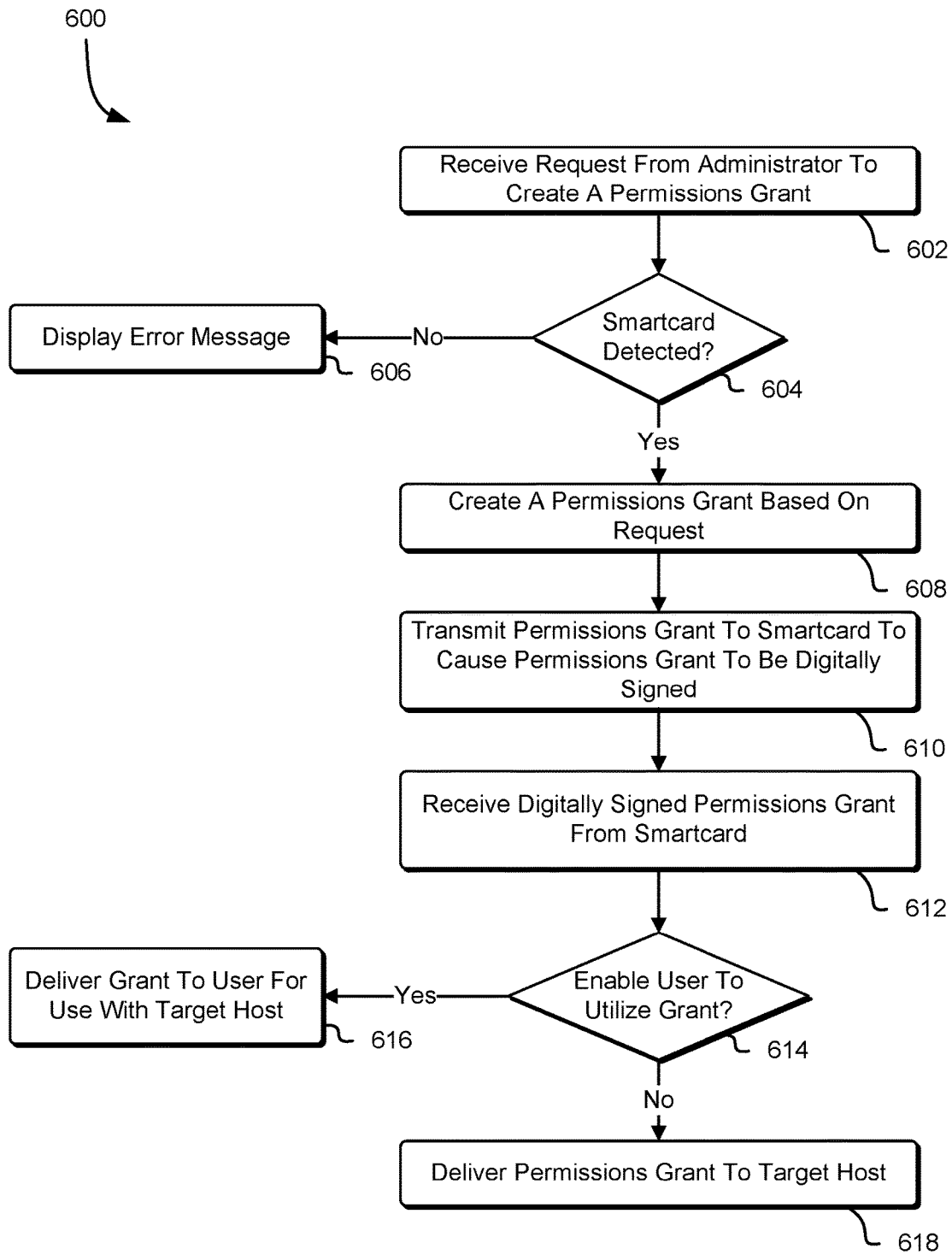
FIG. 6 shows an illustrative example of a process for generating and delivering a permissions grant to a target resource in response to an administrator request in accordance with at least one embodiment.

As noted above, the permissions management service may be configured to enable resource owners and administrators to create and manage one or more permissions grants in order to define a set of actions that users may perform on their resources. Additionally, the permissions management service may be configured to deliver these permissions grants to a plurality of resources. Accordingly, FIG. 6 shows an illustrative example of a process 600 for generating and delivering a permissions grant to a resource in response to an administrator request in accordance with at least one embodiment. The process 600 may be performed by the aforementioned permissions management service, configured to communicate with other computing devices utilized by resource owners and administrators over one or more communications networks, such as the Internet. Additionally, the permissions management service may be configured to create and manage one or more permissions grants on behalf of resource owners and administrators, as well as communicate with the associated resources owned or managed by the resource owners and administrators.

As noted above, the permissions management service may include an interface, which resource owners and administrators may use to communicate with the permissions management service and submit a request to create and/or manage permissions grants. Accordingly, the permissions management service may receive 602 a request from a resource owner or administrator to create a permissions grant. The request may include a listing of users that may perform one or more actions on a particular resource. Additionally, the request may include a listing of one or more actions that may be performed by each user included in the listing of users. A resource owner or administrator may also include one or more additional parameters within the request. For instance, a resource owner or administrator may define, within the request, a particular expiration data for the permissions grant to be created. Additionally, the resource owner or administrator may specify whether the created permissions grant may be delivered to each user specified in the listing of users included within the permissions grant.

In order for a newly created permissions grant to be transmitted to a resource, the permissions grant may need to be digitally signed to prevent potential tampering by other entities. Accordingly, a private cryptographic key of a cryptographic key pair may be needed to digitally sign and, in some cases, encrypt a permissions grant. Additionally, a digital certificate comprising a public cryptographic key may need to be included with the digitally signed permissions grant such that the target resource may utilize this key to verify the authenticity of the permissions grant. Thus, in an embodiment, a resource owner or administrator is required to introduce a smartcard or other hardware device that includes a private cryptographic key and a corresponding digital certificate that may be required to digitally sign a permissions grant once it has been created. Accordingly, the permissions management service may be configured to determine 604 whether a smartcard or other hardware device has been detected. For instance, the permissions management service may be configured to interact with a computer device used by the resource manager or administrator to detect the presence of a smartcard or other hardware device. If a smartcard or other hardware device is detected, the permissions management service may determine whether the smartcard or other hardware device includes a private cryptographic key necessary to digitally sign and, in some cases, encrypt the requested permissions grant, as well as a digital certificate usable to verify the authenticity of the permissions grant.

If the permissions management service does not detect the presence of a smartcard or the smartcard does not include a private cryptographic key and a digital certificate, the permissions management service may cause the interface to display 606 an error message to the resource owner or administrator. The error message may include information detailing the one or more reasons why the request could not be fulfilled by the permissions management service. For instance, the error message may include a statement that may inform the resource owner or administrator that the permissions management service was unable to locate a private cryptographic key and/or a digital certificate which may be required to digitally sign the permissions grant and enable a resource to authenticate and, in some cases, decrypt the permissions grant, respectively.

If the permissions management service has detected the presence of a smartcard that includes the private cryptographic key and the digital certificate, the permissions management service may create 608 a permissions grant based at least in part on the request from the resource owner or administrator. Subsequently, the permissions management service may transmit 610 the permissions grant to the smartcard, along with one or more executable instructions that may cause the smartcard to utilize the private cryptographic key to digitally sign the permissions grant. Once the permissions grant has been digitally signed through use of the smartcard, the smartcard may transmit the digitally signed permissions grant to the permissions management service.

Accordingly, the permissions management service may receive 612 the digitally signed permissions grant from the smartcard. This may cause the permissions management service to store the digitally signed permissions grant in a permissions grant data store until delivery to each user specified in the listing of users in the permissions grant or the target resource. Additionally, the permissions management service may store the corresponding digital certificate in a digital certificate data store managed by the permissions management service. The digital certificate may be stored in this data store until the permissions grant is delivered to each user specified in the listing of users in the permissions grant or the target resource.

While a smartcard or other hardware device is used extensively throughout the present disclosure to illustrate use of a private cryptographic key to digitally sign a permissions grant and delivery of a digital certificate to the permissions management service, the smartcard or hardware device may not be required. For instance, in an embodiment, the permissions management service may include a single private cryptographic key which may be used to digitally sign and, in some cases, encrypt any permissions grant created by the permissions management service. Accordingly, the permissions management service may also manage a single digital certificate, which may include the public cryptographic key required to verify the authenticity of the permissions grant. Thus, the permissions management service may be able to create 608 a permissions grant based on a request from a resource owner or administrator even if a smartcard or other hardware device is not detected.

Once the permissions grant has been created and digitally signed, the permissions management service may determine 614 whether each user specified in the listing of users in the permissions grant is to be enabled to utilize the permissions grant. For instance, as described above, a resource owner or administrator may specify, through the request to create a new permissions grant, that the permissions grant should be provided to each user specified in a listing of users permitted to perform one or more actions on the target resource. Alternatively, the permissions management service may be configured to propagate the permissions grant to each user automatically without resource owner or administrator input. Accordingly, if each user is to be allowed to utilize the permissions grant when accessing the target resource, the permissions management service may deliver 616 the permissions grant to each user specified in the listing of users in the permissions grant for use with the target resource or host.

If, however, the request to create the permissions grant did not include a requirement that the permissions grant is to be delivered to each user specified in a listing of users permitted to perform at least one action on the target resource, the permissions management service may instead deliver 618 the created permissions grant to the target resource or host. As noted above, the created permissions grant may be digitally signed by the smartcard using a private cryptographic key. Accordingly, the corresponding digital certificate comprising a public cryptographic key usable to authenticate and, in some cases, decrypt the digitally signed permissions grant may also be delivered to the target resource.

Figure 7:
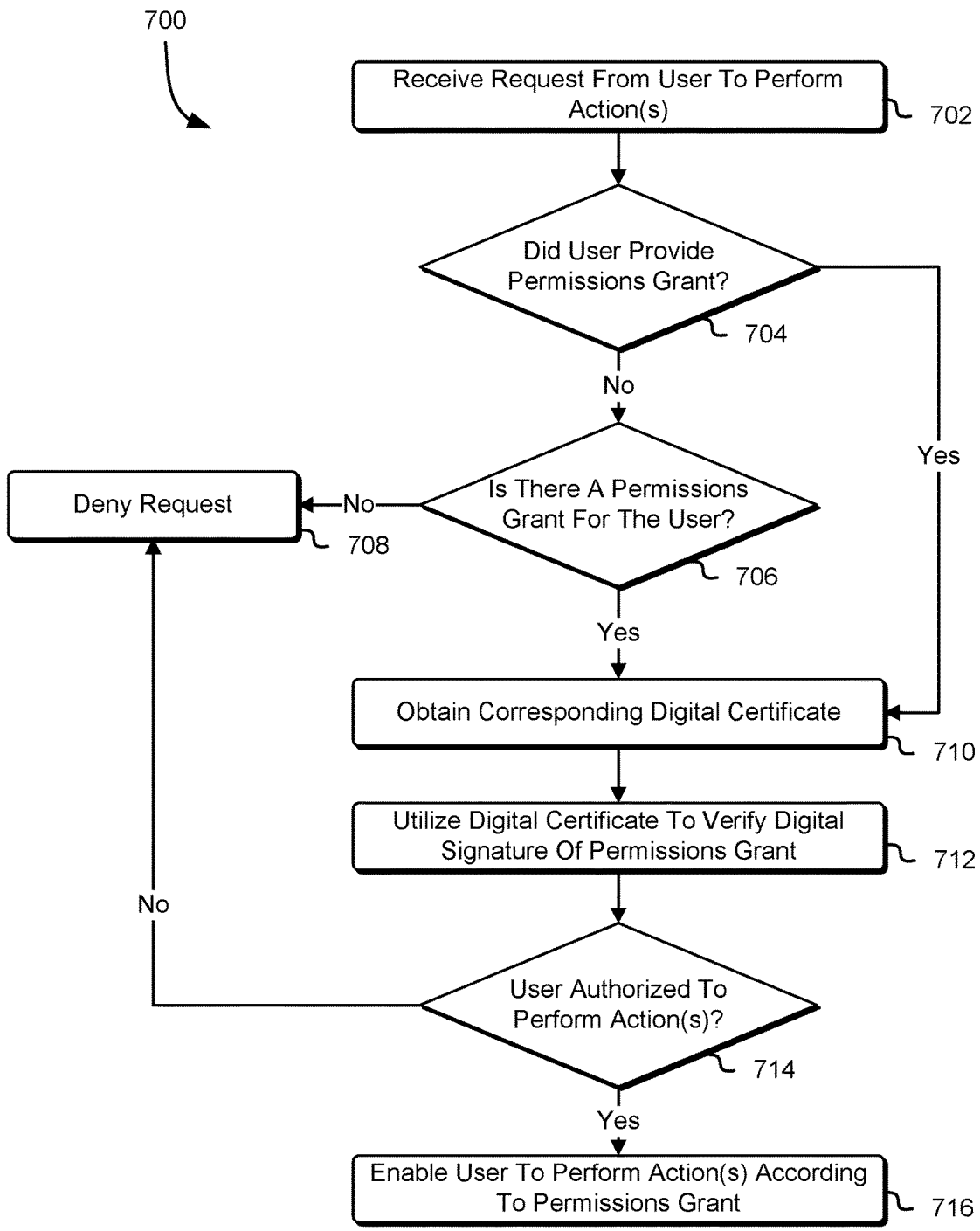
FIG. 7 shows an illustrative example of a process for utilizing a permissions grant to determine whether to process a user request to perform one or more actions using a target resource in accordance with at least one embodiment.

As noted above, a resource owner or administrator may utilize a permissions management service to create a permissions grant that may be used to define one or more actions that be performed by a user on a resource. Thus, a resource may obtain this permissions grant and enable a user to perform an action on the resource based at least in part on the permission grant. Accordingly, FIG. 7 shows an illustrative example of a process 700 for utilizing a permissions grant to determine whether to process a user request to perform one or more actions using a target resource in accordance with at least one embodiment. The process 700 may be performed by a resource configured to utilize one or more permissions grants to determine a plurality of actions that may be performed by one or more authorized users, as defined within the permissions grant. Further, the resource may be configured to utilize a digital certificate to verify the digital signature of a permissions grant prior to enabling a user to perform one or more action on the resource.

A resource owner or administrator may allow other users to utilize a resource for a variety of purposes. For instance, a user may be authorized to utilize a resource to modify a webpage on behalf of the resource owner or administrator. Accordingly, a user may access the resource and submit a request to perform one or more actions on the resource. Thus, the resource may receive 702 this request from a user to perform these one or more actions. The request may include one or more commands, such as one or more API calls to the resource, which may cause the resource to enable the user to perform these one or more actions. Further, in some embodiments, the user can include with the request a digitally signed permissions grant comprising a listing of actions that may be performed by this user. Accordingly, the resource may determine 704 whether the user has provided, along with the initial request, a permissions grant, which may be used by the resource to determine whether the user is authorized to perform the requested one or more actions on the resource.

If the user did not provide a permissions grant along with his/her request to perform one or more actions on the resource, the resource may determine 706 whether there is a permissions grant available that includes a listing of one or more actions that may be performed by the user. As noted above, the resource may comprise a signed grants data store, which may be used to persistently store one or more digitally signed permissions grants. These permissions grants may be created by a permissions management service in response to a request from a resource owner or administrator, as described above in connection with FIG. 6. Additionally, the resource may comprise a public certificate data store which may be used to persistently store one or more digital certificates. These digital certificates may include a public cryptographic key which may be used to verify a digital signature of the digitally signed permissions grant within the signed grants data store. Further, the resource may include database or table comprising a listing of all permissions grants stored within the signed grants data store and a corresponding listing of users specified within these permissions grants. Thus, a resource may utilize this database or table to locate a permissions grant that includes one or more privileges for the user.

If the resource is unable to identify a permissions grant that includes a listing of one or more actions that may be performed by the user, the resource may deny 708 the user's request to perform the one or more actions on the resource. However, if the resource is able to identify a permissions grant stored within the signed grants data store that includes a listing of one or more actions that may be performed by the user on the resource or the user has provided, with the request, a digitally signed permissions grant, the resource may access the public certificate data store to obtain 710 a corresponding digital certificate that may be used to verify the digital signature of the permissions grant. As noted above, a permissions management service may be configured to provide a target resource with a digital certificate comprising a public cryptographic key that may be used to verify the permissions grant was created by an authorized entity. In an embodiment, this digital certificate can be provided to the permissions management service by a resource owner or administrator. For instance, as described above, a resource owner or administrator may be issued a smartcard or other hardware device that includes a personal private cryptographic key and a digital certificate. Thus, when the resource owner or administrator submits a request to the permissions management service to create a new permissions grant, the permissions management service may extract the digital certificate from the smartcard and transmit the created permissions grant to the smartcard, which may utilize the private cryptographic key to digitally sign the permissions grant. In an alternative embodiment, the permissions management service maintains a single digital certificate and private cryptographic key that may be used to digitally sign any newly created permissions grants. In either case, the permissions management service may provide the digital certificate that corresponds to a digitally signed permissions grant to the target resource.

Accordingly, the resource may utilize 712 the digital certificate to verify the digital signature of the selected permissions grant. For instance, the resource may use the digital certificate to obtain a public cryptographic key. Accordingly, this public cryptographic key may be used to verify the digital signature attached to the permissions grant and obtain a hash value. Further, the resource may utilize a hash function to hash the permissions grant and obtain a second hash value. If these hash values match, then the digital signature may be deemed to be valid. Alternatively, if the hash values do not match, then the digital signature may not be valid and the permissions grant may be rejected by the resource.

Once the digital signature attached to the permissions grant has been verified by the resource, the resource may determine 714 whether the user is authorized to perform the one or more actions on the resource. For instance, if the permissions grant does not include the one or more actions requested by the user, then the user may not be authorized to perform these actions on the resource. Accordingly, the resource may deny 708 the user's request. However, if the permissions grant does include a listing of the one or more actions included in the user's request to the resource, the resource may enable 716 the user to perform these one or more actions on the resource.

It should be noted that the process 700 as illustrated in FIG. 7 is illustrative of one method for enabling a user of a resource to perform one or more actions based at least in part on existing permissions grants stored within the resource and/or provided by the user. Accordingly, the process 700 may include additional or fewer actions that may be performed by the target resource in enabling a user to perform one or more actions on the resource. For instance, in an embodiment, the resource can be configured to resolve conflicts between existing permissions grants. For example, if the signed grants data store within the resource includes one or more digitally signed permissions grants comprising a set of actions that may be performed by a user and a user introduces a different permissions grant defining other actions that may be performed by the user on the resource, the resource may disregard the user-provided permissions grant and only utilize the permissions grants stored within the signed grants data store. In another example, if the signed grants data store includes a permissions grant that conflicts with another permissions grant within the signed grants data store (e.g., a first permissions grant allows a user to perform one or more actions while a second permissions grant explicitly prevents the user from performing these one or more actions), the resource may deny the user request to perform the requested one or more actions until the conflict is resolved by a resource owner/administrator or the resource may utilize one or more criteria (e.g., most recently added permissions grant, hierarchy of signing authorities, etc.) to select the appropriate permissions grant to be used.

Figure 8:
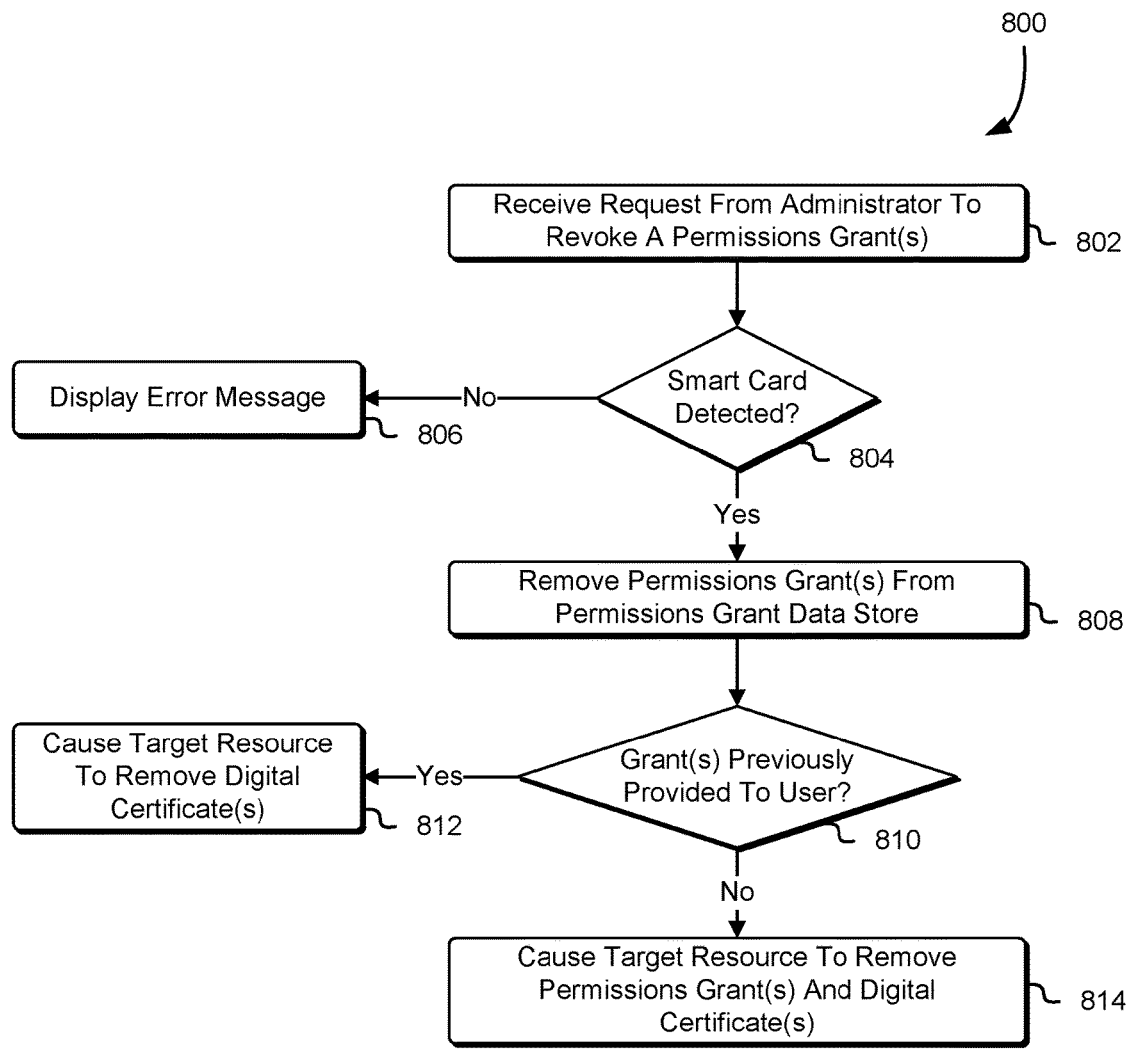
FIG. 8 shows an illustrative example of a process for revoking a permissions grant in response to an administrator request in accordance with at least one embodiment.

As noted above, a resource owner or administrator may access a permissions management service to not only create a permissions grant to enable users to perform one or more actions on a target resource but to also revoke any existing permissions grant to prevent users from performing one or more previously permissible actions on the resource. Accordingly, FIG. 8 shows an illustrative example of a process 800 for revoking a permissions grant in response to an administrator request in accordance with at least one embodiment. The process 800 may be performed by the aforementioned permissions management service, which may be configured to communicate with other computing devices utilized by resource owners and administrators over one or more communications networks, such as the Internet. Additionally, the permissions management service may be configured to manage one or more permissions grants on behalf of resource owners and administrators, as well as communicate with the associated resources owned or managed by the resource owners and administrators.

As noted above, the permissions management service may include an interface, which resource owners and administrators may use to communicate with the permissions management service and submit a request to create and/or manage permissions grants. Accordingly, the permissions management service may receive 802 a request from a resource owner or administrator to revoke an existing permissions grant. As noted above, the permissions management service may maintain a ledger or other database that includes a listing of permissions grants that may be stored within the permissions grant data store managed by the permissions management service and that may have been provided to a plurality of users and/or resources. This ledger or other database may further include a corresponding listing of the resource owners or administrators that requested creation of each of these permissions grants. Thus, the permissions management service may be configured to provide to a resource owner or administrator, through the interface, a listing of all active permissions grants created by the resource owner or administrator. The resource owner or administrator may be able to utilize this interface to select a permissions grant from this listing for revocation.

Once the permissions management service has received a request to revoke an existing permissions grant, the permissions management service may determine 804 whether a smartcard or other hardware device has been detected. As noted above, a resource owner or administrator may be required to introduce a smartcard or other hardware device that may include a private cryptographic key and a corresponding digital certificate that may be used with the permissions grant to be created. Additionally, the resource owner or administrator may be required to introduce the corresponding digital certificate in order for the permissions management service to be able to verify that the resource owner or administrator submitting the request is authorized to revoke the permissions grant. Accordingly, the permissions management service may utilize the digital certificate to verify the digital signature of the permissions grant and thus verify the identity of the resource owner or administrator.

If the permissions management service does not detect the presence of a smartcard or the smartcard does not include a digital certificate or other set of credentials usable to verify the identity of the resource owner or administrator, the permissions management service may cause the interface to display 806 an error message to the resource owner or administrator. The error message may include information detailing the one or more reasons why the request could not be fulfilled by the permissions management service. For instance, the error message may include a statement that may inform the resource owner or administrator that the permissions management service was unable to locate a set of credentials and/or a digital certificate which may be required to revoke the permissions grant.

If the permissions management service has detected the presence of a smartcard that includes the digital certificate and/or a set of credentials usable to verify the identity of the resource owner or administrator, the permissions management service may remove 808 the specified permissions grant from the permissions grant data store. Additionally, the permissions management service may update the ledger comprising a listing of active permissions grants to remove mention of the revoked permissions grant from the listing.

As noted above, when a permissions grant is initially created, the permissions grant may be delivered to each user listed within the listing, included within the permissions grant, of users authorized to perform one or more actions on a target resource. Accordingly, the permissions management service may determine 810 whether the permissions grant was previously provided to one or more users of the target resource. For instance, the target resource may comprise a signed grants data store that may be used to persistently store one or more digitally signed permissions grants. These permissions grants may be provided by the permissions management service upon creation of the permissions grants. However, if the permissions grants are provided to each user authorized to perform one or more actions on the target resource, the target resource may not be required to persistently store these permissions grants, as each user may introduce the permissions grant to the target resource when submitting a request to perform one or more actions on the resource.

Accordingly, if the permissions grant that has been revoked was previously provided to a user of the target resource, the permissions management service may transmit one or more executable instructions to the target resource to cause 812 the target resource to remove a corresponding digital certificate from its public certificate data store. As noted above, the target resource may utilize a digital certificate to verify the authenticity of the digital signature of the permissions grant. Thus, removal of the corresponding digital certificate from the public certificate data store in the target resource may make it impossible to verify the authenticity of the permissions grant and obtain a listing of permissible actions that may be performed by a user on the target resource. Alternatively, if the permissions grant was provided to the target resource, the permissions management service may transmit one or more executable instructions to the target resource to cause 814 the target resource to remove the permissions grant from the signed grants data store and the corresponding digital certificate from the public certificate data store. The target resource may update a database, as described above, to remove any reference to the removed permissions grant such that the target resource may be unable to identify a permissions grant for a user in response to a user request to perform one or more actions on the target resource.

Figure 9:
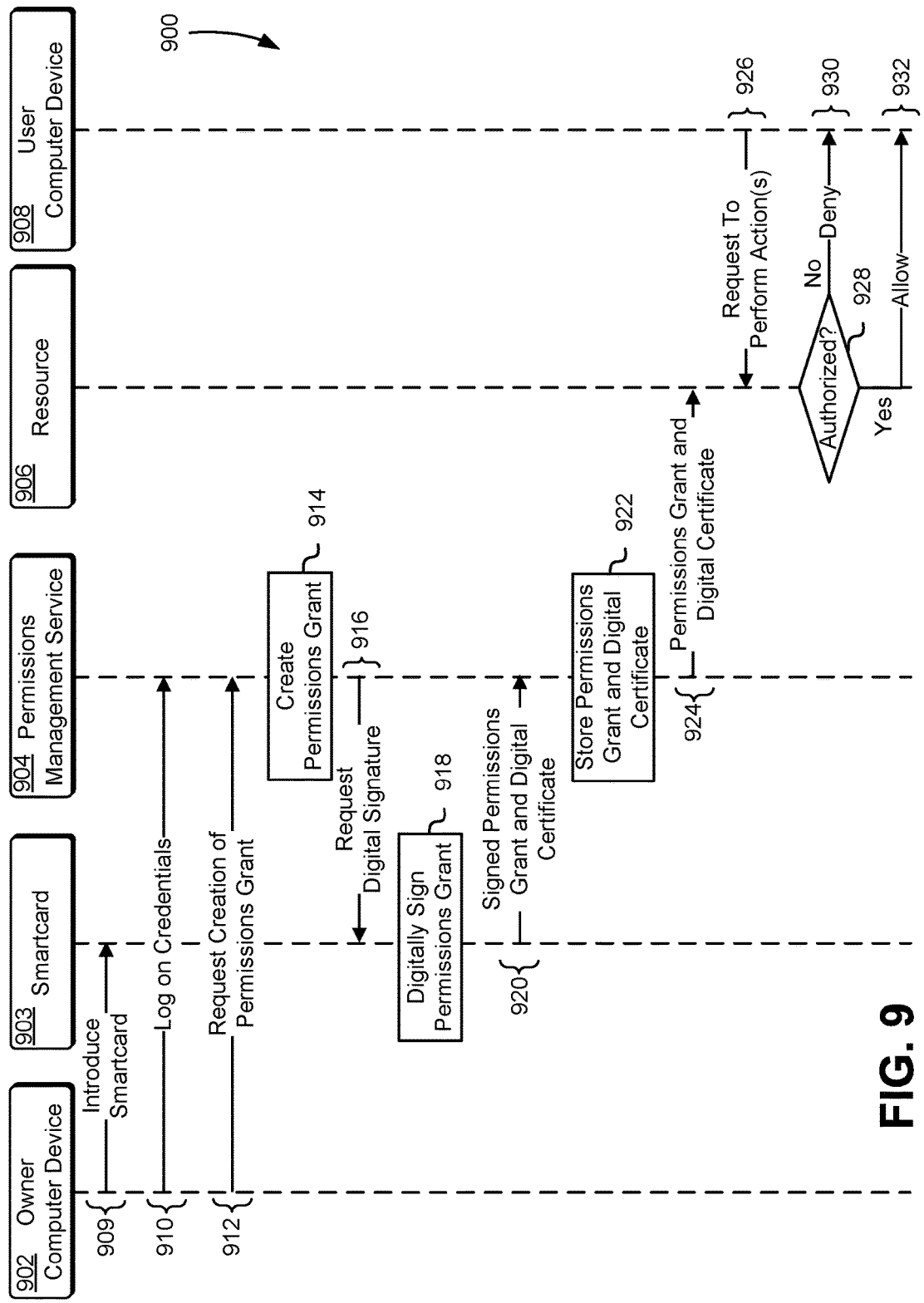
FIG. 9 shows an illustrative example of a message flow diagram for generating and utilizing a digitally signed permissions grant to process user requests to perform one or more actions on a resource in accordance with at least one embodiment.

As noted above, the permissions management service may be configured to enable resource owners and administrators to create and manage one or more permissions grants in order to define a set of actions that users may perform on their resources. Additionally, the permissions management service may be configured to deliver these permissions grants to a plurality of resources. Accordingly, FIG. 9 shows an illustrative example of a message flow diagram 900 for generating and utilizing a digitally signed permissions grant to process user requests to perform one or more actions on a resource in accordance with at least one embodiment. The message flow diagram 900 is similar to the process described above in connection with FIG. 6. For instance, a resource owner or administrator may utilize a computer device 902 to access a permissions management service 904. Accordingly, the resource owner or administrator may utilize the computer device 902 to provide 910 (e.g., through a smartcard 903 or other hardware device that may include a set of credentials) log on credentials to the permissions management service 904 and, subsequently, request 912 creation of a new permissions grant.

In response to the request from the resource owner or administrator, the permissions management service 904 may create 914 the permissions grant and request 916 that the permissions grant be digitally signed by the computer device 902. As noted above, the resource owner or administrator may be required to introduce 909 a smartcard 903 or other hardware device into the computer device 902 to log on to the permissions management service 904. Additionally, this smartcard 903 or hardware device may include a private cryptographic key which may be used to digitally sign a permissions grant and a digital certificate that may include a public cryptographic key usable to verify the digital signature. Thus, in response to the request from the permissions management service 904, the computer device 902 may cause the smartcard to digitally sign 918 the permissions grant. Once the permissions grant has been digitally signed, the computer device 902, through the smartcard 903, may transmit 920 the signed permissions grant and the digital certificate to the permissions management service 904. The permissions management service 904 may store 922 the permissions grant and the digital certificate in a permissions grant data store and a digital certificate data store, respectively. Once the permissions grant and the corresponding digital certificate have been successfully stored, the permissions management service 904 may access a target resource 906 to provide 924 the digitally signed permissions grant and the corresponding digital certificate to the resource 906.

When a user of the resource 906 utilizes his/her computer device 908 to access the resource 906, the user may submit 926 a request to perform one or more actions on the resource 906. Accordingly, the resource 906 may determine 928 whether the user is authorized to perform the requested one or more actions. For instance, the resource 906 may determine whether any of the permissions grants are applicable to the user. Further, if there are any permissions grants that are applicable, the resource 906 may utilize a corresponding digital certificate for each permissions grant to verify the digital signature for each permissions grant. If the permissions grants collectively provide the user with the requisite privileges to perform the requested one or more actions on the resource 906, the resource 906 may allow 932 the user to perform the one or more actions. However, if there are insufficient privileges for the user, the resource 906 may enable the user to perform the actions for which he/she has been grant the privileges to perform and otherwise deny 930 the user from performing the actions not included in the permissions grants. It should be noted that the message flow diagram 900 illustrated shows one possible embodiment of the present disclosure and, as such, variations of the message flow diagram 900, consistent with the techniques and processes described herein, are considered to be within the scope of the present disclosure.

Figure 10:
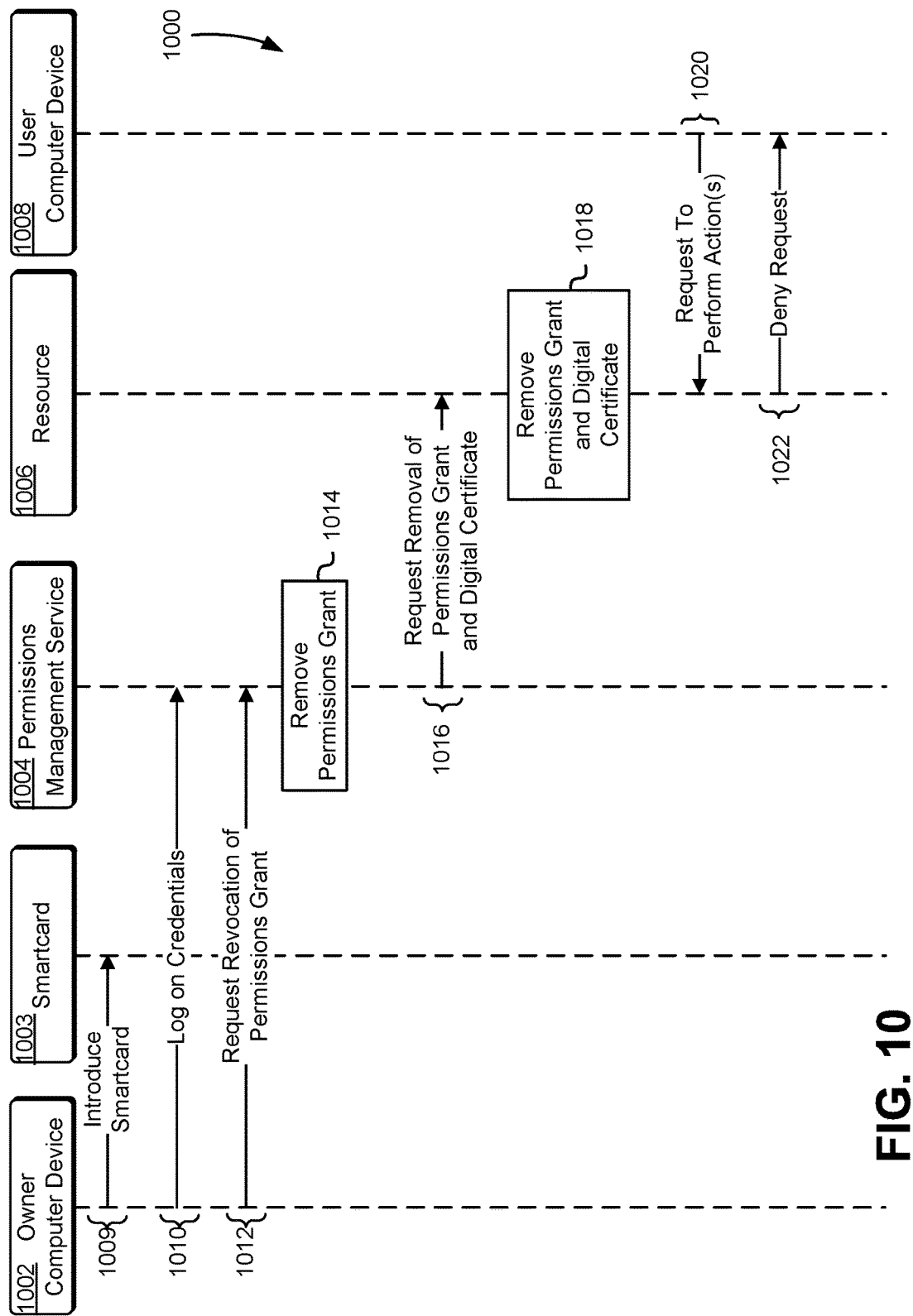
FIG. 10 shows an illustrative example of a message flow diagram for revoking a permissions grant in accordance with at least one embodiment.

As noted above, a resource owner or administrator may utilize the permissions management service to request revocation of one or more permissions grants in order to prevent one or more users of a resource from performing one or more actions on the resource. Accordingly, FIG. 10 shows an illustrative example of a message flow diagram 1000 for revoking a permissions grant in accordance with at least one embodiment. The message flow diagram 1000 is similar to the process described above in connection with FIG. 8. For instance, a resource owner or administrator may utilize a computer device 1002 to access a permissions management service 1004. Accordingly, the resource owner or administrator may utilize the computer device 1002 to provide 1010 (e.g., through introducing 1009 a smartcard 1003 or other hardware device that may include a set of credentials) log on credentials to the permissions management service 1004 and, subsequently, request 1012 revocation of one or more existing permissions grants. Accordingly, the permissions management service 1004 may remove 1014 the permissions grants from its permissions grant data store.

Once the permissions grants have been removed from the permissions grant data store, the permissions management service 1004 may access a target resource 1006 to request 1016 removal of the permissions grants and corresponding digital certificates from the resource 1006. In response to the request, the resource 1006 may remove 1018 the permissions grants and corresponding digital certificates. Thus, when a user of the resource 1006 utilizes his/her computer device 1008 to access the resource 1006 and submit 1020 a request to perform one or more actions, the resource 1006 may be unable to identify a permissions grant that includes a listing of these one or more actions and, thus, may deny 1022 the user's request. It should be noted that the message flow diagram 1000 described above shows one possible embodiment of the present disclosure and, as such, variations of the message flow diagram 1000, consistent with the techniques and processes described herein, are considered to be within the scope of the present disclosure.

Figure 11:
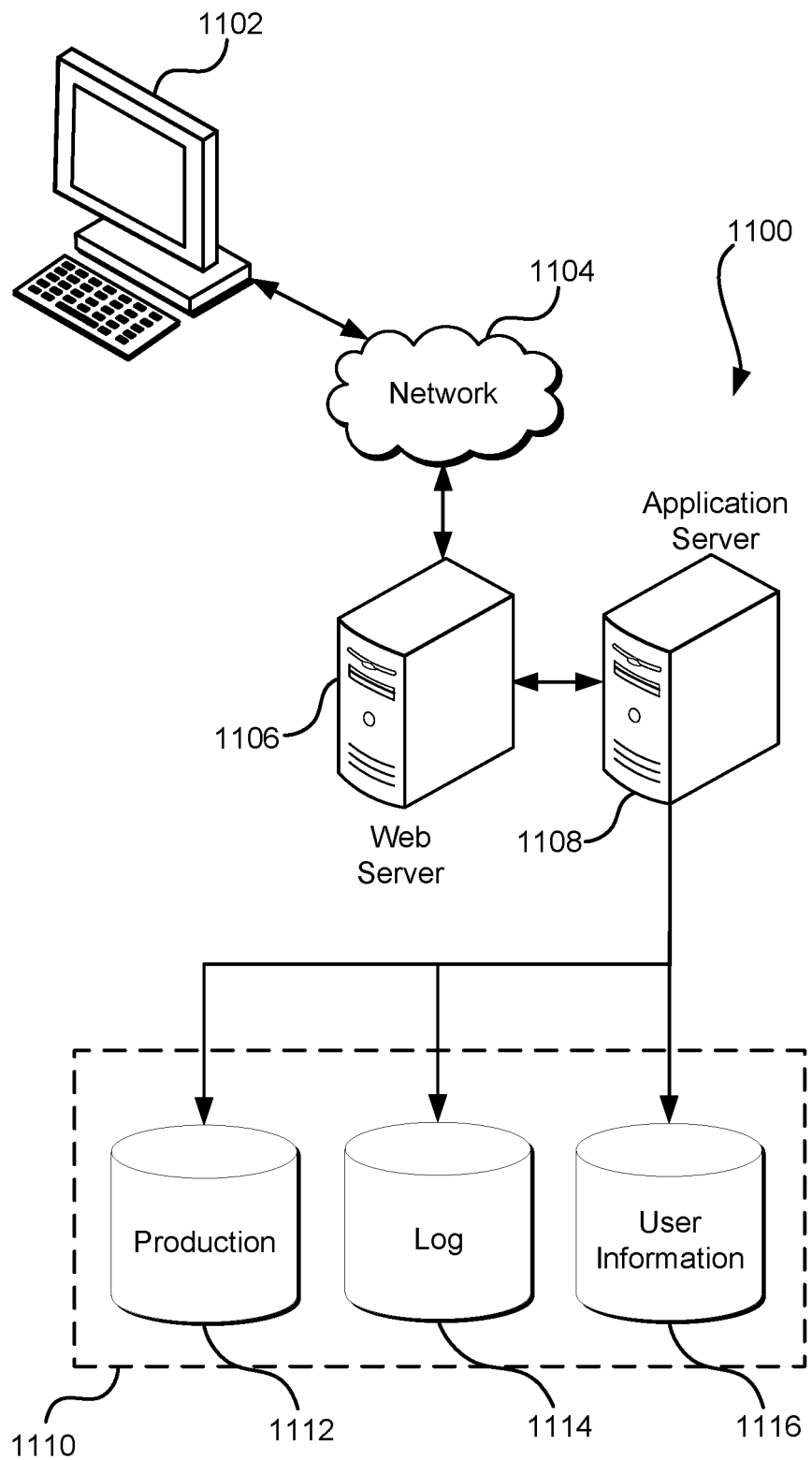
FIG. 11 illustrates an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and/or receive requests, messages or information over an appropriate network 1104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1102 and the application server 1108, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1110 can include several separate data tables, databases, data documents, dynamic data storage schemes and/or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. The application server 1108 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
creating a first and second permissions grant specifying one or more users authorized to perform one or more actions on a respective first and second computing resource and based at least in part on a respective first and second request specifying the one or more users;
receiving, from a first device associated with a first user authorized to grant privileges, a first digitally signed permissions grant signed by a first private cryptographic key;
receiving, from a second device associated with a second user authorized to grant privileges, a second digitally signed permissions grant signed by a second private cryptographic key, wherein the first and second digitally signed permissions grants were signed by a ledgering service using a third private cryptographic key; and
transmitting the first and second digitally signed permissions grants to the respective first and second computing resources, which respectively utilize a first and second public cryptographic key to verify the respective first and second digital signature, and if the respective first and second digital signature are verified, determine whether at least one user is permitted to perform one or more actions on first or second computing resources by respectively determining whether the at least one user is permitted to perform the one or more actions based at least in part on a third public cryptographic key corresponding to the third private cryptographic key.

2. The computer-implemented method of claim 1, wherein a first smartcard is communicatively coupled to the first device, the first smartcard configured for close-range communications and including one or more first storage devices that persistently store the first private cryptographic key; and wherein a second smartcard is communicatively coupled to the second device, the second smartcard configured for close-range communications and including one or more second storage devices that persistently store the second private cryptographic key.

3. The computer-implemented method of claim 1, wherein the first and second digitally signed permissions grants are stored within a permissions grant data store comprising one or more physical storage devices for storage of a plurality of permissions grants such that the first digitally signed permissions grant can be modified by the first user authorized to grant privileges and the second digitally signed permissions grant can be modified by the second user authorized to grant privileges.

4. The computer-implemented method of claim 1, wherein the first computing service comprises a computing application, a computing process, a host computing device, a database, a network computing service, or a data store.

5. The computer-implemented method of claim 1, wherein the first request to create the first permissions grant further includes first information indicating an expiration for the first permissions grant such that the first digitally signed permissions grant is removed from the first computing resource automatically based at least in part on the first information; and wherein the second request to create the second permissions grant further includes second information indicating an expiration for the second permissions grant such that the second digitally signed permissions grant is removed from the second computing resource automatically based at least in part on the second information.

6. A system, comprising:
at least one network computing device configured to implement one or more services, wherein the one or more services:
creates a first grant based at least in part on a first request from a first device associated with a first user authorized to grant privileges for performing at least one action on a first resource, the first request comprising a listing of at least one action that can be performed by at least one user of the first resource;
creates a second grant based at least in part on a second request from a second device associated with a second user authorized to grant privileges for performing at least one action on a second resource, the second request comprising a listing of at least one action that can be performed by at least one user of the second resource;
transmits, to the first device, a third request to cause the first grant to be cryptographically verifiable and generating a first cryptographically verifiable grant;
receives, from the second device associated with the second user authorized to grant privileges, a second cryptographically verifiable grant; and
transmits the first and second cryptographically verifiable grant to the respective first and second resources, wherein the first and second resources respectively cryptographically verify the first and second grant and determine whether at least one user is permitted to perform an action on the respective first and second resources based at least in part on a user request to perform an action on the first and second resources.

7. The system of claim 6, wherein causing the first grant to be cryptographically verifiable includes using a first private cryptographic key to digitally sign the first grant with a first digital signature such that a first public cryptographic key can be used to verify the first digital signature; and wherein causing the second grant to be cryptographically verifiable includes using a second private cryptographic key to digitally sign the second grant with a second digital signature such that a second public cryptographic key can be used to verify the second digital signature.

8. The system of claim 7, wherein a permissions management service delivers a first digital certificate comprising the first public cryptographic key corresponding to the first private cryptographic key to the first one or more resources such that the first one or more resources can extract the first public cryptographic key to cryptographically verify the first grant; and the permissions management service delivers a second digital certificate comprising the second public cryptographic key corresponding to the second private cryptographic key to the second one or more resources such that the second one or more resources can extract the second public cryptographic key to cryptographically verify the second grant.

9. The system of claim 7, wherein causing the first grant to be cryptographically verifiable includes causing a first hardware device communicatively coupled to the first device to make the first grant cryptographically verifiable and provide the first cryptographically verifiable grant and a first public cryptographic key; and wherein causing the second grant to be cryptographically verifiable includes causing a second hardware device communicatively coupled to the second device to use a second private cryptographic key to make the second grant cryptographically verifiable and provide the second cryptographically verifiable grant and a second public cryptographic key.

10. The system of claim 9, wherein the first hardware device comprises a first smartcard configured for close-range communications with a first computer system that includes one or more first storage devices that persistently store the first private cryptographic key and the first public cryptographic key; and wherein the second hardware device comprises a second smartcard configured for close-range communications with a second computer system that includes one or more second storage devices that persistently store the second private cryptographic key and the second public cryptographic key.

11. The system of claim 6, wherein the first request to create the first grant further includes first information indicating an expiration for the first grant such that the first cryptographically verifiable grant is removed from the first one or more resources automatically based at least in part on the first information; and wherein the second request to create the second grant further includes second information indicating an expiration for the second grant such that the second cryptographically verifiable grant is removed from the second one or more resources automatically based at least in part on the second information.

12. The system of claim 6, wherein the first cryptographically verifiable grant is stored within a permissions grant data store comprising one or more physical storage devices for storage of a plurality of grants, including the first and second cryptographically verifiable grants and such that the first cryptographically verifiable grant can be modified by the first user authorized to grant privileges; and such that the second cryptographically verifiable grant can be modified by the second user authorized to grant privileges.

13. A non-transitory computer-readable storage media having stored thereon executable instructions that, if executed by one or more processors of a computer system, cause the computer system to:
based on receiving a first request from a first device, create a first permissions grant specifying one or more users authorized to perform one or more actions on one or more first resources;
based on receiving a second request from a second device, create a second permissions grant specifying one or more users authorized to perform one or more actions on one or more second resources;
transmit requests to cause the first and second permissions grants to be cryptographically verifiable, wherein the requests cause the first device to generate a first cryptographically verifiable grant and the second device to generate a second cryptographically verifiable grant; and
transmit the first and second cryptographically verifiable permissions grants to the respective first and second one or more resources to cause the first and second one or more resources to utilize the first and second cryptographically verifiable permissions grants to determine whether to allow users of the one or more first and second resources to perform one or more actions on the one or more first and second resources.

14. The non-transitory computer-readable storage media of claim 13, wherein to cause the first permissions grant to be cryptographically verifiable includes:
using a first private cryptographic key to digitally sign the first permissions grant such that the first permissions grant is cryptographically verifiable using a first public cryptographic key corresponding to the first private cryptographic key; and
transmitting the first public cryptographic key usable to cryptographically verify the digitally signed first permissions grant to the one or more first resources to cause the one or more first resources to cryptographically verify the digitally signed first permissions grant; and
wherein to cause the second permissions grant to be cryptographically verifiable includes:
using a second private cryptographic key to digitally sign the second permissions grant such that the second permissions grant is cryptographically verifiable using a second public cryptographic key corresponding to the second private cryptographic key; and
transmitting the second public cryptographic key usable to cryptographically verify the digitally signed second permissions grant to the one or more second resources to cause the one or more second resources to cryptographically verify the digitally signed second permissions grant.

15. The non-transitory computer-readable storage media of claim 14, wherein to cause the first permissions grant to be cryptographically verifiable further includes:
causing a ledgering service to use a third cryptographic key to digitally sign the first permissions grant such that the first permissions grant is cryptographically verifiable using the first public cryptographic key corresponding to the first private cryptographic key and a third public cryptographic key corresponding to a third private cryptographic key; and
transmitting the third public cryptographic key usable in conjunction with the first public cryptographic key to cryptographically verify the digitally signed first permissions grant to the first one or more resources to cause the first one or more resources to cryptographically verify the digitally signed first permissions grant.

16. The non-transitory computer-readable storage media of claim 13, wherein to cause the first permissions grant to be cryptographically verifiable includes:
causing a first device to digitally sign the first permissions grant such that the first permissions grant is cryptographically verifiable using a first public cryptographic key corresponding to the first private cryptographic key; and
receiving, from the first device, the digitally signed first permissions grant and the first public cryptographic key usable to cryptographically verify the digitally signed first permissions grant; and
wherein to cause the second permissions grant to be cryptographically verifiable includes:
causing a second device to digitally sign the second permissions grant such that the second permissions grant is cryptographically verifiable using a second public cryptographic key corresponding to the second private cryptographic key; and
receiving, from the second device, the digitally signed second permissions grant and the second public cryptographic key usable to cryptographically verify the digitally signed second permissions grant.

17. The non-transitory computer-readable storage media of claim 16, wherein the first device comprises a first hardware device configured for close-range communications with a first computer system that includes one or more first storage devices that persistently store the first private cryptographic key and the first public cryptographic key; and wherein the second device comprises a second hardware device configured for close-range communications with a second computer system that includes one or more second storage devices that persistently store the second private cryptographic key and the second public cryptographic key.

18. The non-transitory computer-readable storage media of claim 13, wherein the executable instructions further cause the computer system to store the first and second cryptographically verifiable permissions grants within a permissions grant data store comprising one or more physical storage devices for storage of a plurality of permissions grants such that the first and second cryptographically verifiable permissions grants can be respectively modified by the first and second users authorized to grant privileges.

19. The non-transitory computer-readable storage media of claim 13, wherein the first request to create the first permissions grant further includes first information indicating an expiration for the first permissions grant such that the cryptographically verifiable first permissions grant is removed from the first one or more resources automatically based at least in part on the first information; and wherein the second request to create the second permissions grant further includes second information indicating an expiration for the second permissions grant such that the cryptographically verifiable second permissions grant is removed from the second one or more resources automatically based at least in part on the second information.

20. The computer-implemented method of claim 1, wherein the ledgering service stores records of the first and second digitally signed permission grants.

\* \* \* \* \*